United States Patent [19]
Matsuba et al.

[11] 4,042,776
[45] Aug. 16, 1977

[54] WATER TREE FREE POWER CABLE

[75] Inventors: Hironori Matsuba, Kawasaki; Kazumi Satou, Ichihara, both of Japan

[73] Assignee: The Furukawa Electric Company, Ltd., Tokyo, Japan

[21] Appl. No.: 606,601

[22] Filed: Aug. 21, 1975

[51] Int. Cl.² ............................................. H01B 3/30
[52] U.S. Cl. .............................. 174/110 R; 174/107; 174/110 PM; 174/110 AR; 427/117
[58] Field of Search .................. 174/110 PM, 110 SR, 174/110 AR, 120 SR, 120 SC; 427/58, 117

[56] References Cited
U.S. PATENT DOCUMENTS 3,663,742  5/1972  Hasebe et al. ............... 174/120 SC

OTHER PUBLICATIONS

IEEE Transactions on Electrical Insulation, pp. 26–34, Mar. 1974.

Primary Examiner—Arthur T. Grimley
Attorney, Agent, or Firm—Armstrong, Nikaido & Marmelstein

[57] ABSTRACT

A power cable having a plastic electrical insulation which is partially or wholly composed of a plastic compound. The plastic compound containing an inorganic or organic electrolyte which ionizes when dissolved in water, the power cable prevents the deterioration of insulation called "water tree" which has been a fatal drawback of the plastic insulation layers of the conventional plastic insulated cables such as cross-linked polyethylene cables, etc.

11 Claims, 1 Drawing Figure

FIG. I
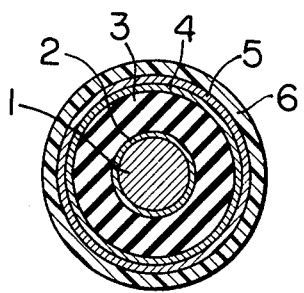

WATER TREE FREE POWER CABLE

DETAILED DESCRIPTION OF THE INVENTION

This invention relates to a power cable which effectively prevents the deterioration of insulation caused by a phenomenon called water tree and to the accessories of the cable and more particularly to a method for preventing such deterioration of insulation in the plastic electrical insulation used for the power cable and its accessories, the method being suitable for application to from a relatively low voltage power cable of the class between 3 and 22 KV to high voltage power cable of the class between 66 and 154 KV.

It is well known that plastic insulated power cable which are typified by cross-linked polyethylene insulated power cables possess many advantages. On account of such advantages, plastic insulated power cables are widely in use. When they have been in service for a long period of time, however, there takes place a phenomenon called water tree with exterior water entering the insulation to diffuse and condense there. This deteriorates the insulation material of the cable and might cause dielectric breakdown. In order to prevent such, therefore, a metal sheath of lead, aluminum or the like is generally provided on the insulation layer.

The cable that is provided with a metal sheath as a water screening layer is capable of preventing water tree. However, such cable is not only very expensive but also is difficult to handle in connecting work due to the weight which is increased by the addition of the metal layer. These have been the drawbacks of the conventional cables.

A general object of this invention is therefore to provide a power cable which is free from such drawbacks and to provide a method for preventing the water tree from taking place in the insulation layer of the cable.

The mechanism of the initiation and development of the water tree phenomenon was unknown. The inventors of this invention, however, have successfully attempted to clarify the mechanism and come to contrive the water tree preventing method of this invention in accordance with the clarified mechanism.

The water tree takes place at a part where the electric field is strong and forms a mass of minute voids filled with water. The mass of such voids are formed when the chemical potential $\mu_w$ of the water contained in the minute voids is decreased by an electric field. This can be expressed in the following formula:

$$\mu_w = \mu_o - \frac{1}{2} \cdot \epsilon_o \left(\frac{\delta \epsilon}{\delta p}\right)_T E_1^2 \quad (1)$$

In formula (1) above, $\mu_o$ represents the chemical potential of water in the minute voids when there is no electric field; $\epsilon$ the specific inductive capacity of water; $\epsilon_o$ the dielectric constant of vacuum; $p$ the density of water; $E_1$ the electric field in a mass of minute voids filled with water; and $T$ the temperature.

In Formula (1), $(\delta\epsilon/\delta p)_T > 0$

Therefore, $\mu_w < \mu_o$ and the water contained in the parts having no electric field, namely exterior water, enters and diffuses in the minute voids. As a result of this, the minute voids increases to form the water tree.

Assuming that the minute voids are of a spherical shape and that the electric field in the insulation of the cable is $E_o$, the value of $E_1$ can be obtained from the following formula:

$$E_1 = \frac{3\epsilon}{\epsilon_2^* + 2\epsilon_1} E_O \quad (2)$$

wherein $\epsilon_2^* = \epsilon - j\sigma/w\epsilon_o$ (complex specific inductive capacity) $\quad (3)$ $\sigma$: conductivity of water
$w$: angular frequency As apparent from Formula (1), the smaller the $E_1$, the lower the growing rate of the water tree will be. Accordingly, the water tree can be prevented by making the value of $E_1$ smaller.

In accordance with this invention, an electrolyte which dissolves in water and thus increases the electric conductivity of the water is added to the insulation material in the preparation of the insulator to make $E_1$ small, so that the water tree can be prevented. In other words, the principle that $E_1$ in Formula (2) becomes smaller as $\sigma$ in Formula (3) becomes greater is utilized in the invention. The invention will become more apparent from the following description:

Any inorganic or organic matter that dissoves in water to increase the electric conductivity of the water may be employed as such electrolytes. The preferred electrolytes for practising this invention include strong electrolytes such as sodium chloride, sodium sulfate, potassium chloride, potassium sulfate, other alkali metal salts, alkali earth metal salts, ammonium chloride, other ammonium salts, cupric sulfate, other metal salts, sodium acetate, other salts of other carboxylic acid, salts of organic sulfonic acid, etc., of which sodium sulfate most excels in preventing the water tree. These electrolytes neither move in the insulation, nor enter into the insulation.

The quantity of the electrolyte to be added is at least $10^{-7}$% by weight to the insulation material. Addition of such electrolyte in excessive quantity would produce an adverse effect in terms of the insulation characteristic and the infiltration of water due to osmotic pressure. To avoid such, the addition quantity should be less than 1% by weight to the insulation material.

To ensure an adequate effect of preventing water tree, it is also preferable to disperse, as evenly as possible, the electrolyte in the form of microparticles of less than several $\mu$m in the plastic compound which is used to form a plastic insulation. The best results can be obtained by the use of a plastic insulation formed with such a plastic compound that is prepared with the micro-particles of the electrolyte evenly dispersed therein.

The process for effecting the even dispersion of the minute particles of an electrolyte measuring less than several $\mu$m may be selected from:

1. Mix these micro-particles of electrolyte and an insulation material by means of a mixing extruder called "Brabender plastograph," rolls, etc.

2. Dissolve such particles of electrolyte in water alcohol, etc., and mix the solution thus prepared with an insulation material by adding it by suitable means such as rolls, a mixing extruder called Brabender plastograph, etc.

3. Immerse a pelletized insulation material in the above stated solution. Then, after the micro-particles are made to stick to the surfaces of the pellets by evaporating the solvent, mold an insulation by an ordinary process using an extruder or the like.

4. Add the above stated particles of electrolyte to an additive which is usually used for such insulation materials. Then use the mixture in molding the insulation.

The electrolyte material can be added by any of these processes. Furthermore, in the case of the insulations that are molded by a method other than extrusion molding, such as mold joints, etc., such electrolyte material may be added beforehand to the plastic tape which is a mold material, or the micro-particles of such electrolyte may be allowed to stick to the tape surface beforehand. With such arrangement, the water tree due to any flaws in such adhesive faces can be effectively prevented.

The object, features and advantages of this invention will more fully appear from the following detailed description taken in connection with the accompanying drawing in which:

BRIEF DESCRIPTION OF DRAWING

FIG. 1 is a sectional view illustrating a typical plastic insulated power cable.

The reference numeral 1 indicated a core conductor and 3 a plastic insulation layer. Normally, there is provided a semiconductor layer 2 between the core conductor 1 and the plastic insulation layer 3. On the external circumference of the insulation layer 3, there is provided a plastic sheath 6, made of polyvinyl chloride for example, through another semiconductive layer 4 and a screening layer 5 of a copper tape.

When this invention is applied to the plastic insulated power cable illustrated in the drawing, the screening layer 5 is no longer required and can be omitted. Then, the structure of the cable can be simplified with an electrolyte mixed in the plastic insulation layer 3 and with the insulation arranged round the conductor 1.

The conspicuous advantages that can be expected from a plastic insulated power cable prepared in accordance with this invention include:

1. The use of a metal sheath for preventing the infiltration of water is no longer required.
2. The water tree can be prevented even if there are foreign matters and voids in the insulation layer or some flaws on the surfaces of the insulation layer and the semiconductive layer such as protrusions, etc.
3. Since the electrolyte to be added for the purpose of preventing water tree is available at a low cost, the use of it causes an increase in the cost of material only to a negligible degree. Such increase in the cost of material is only about 1% of, for example, the cost of a cross-linked polyethylene insulated power cable, while the metal sheath which is employed in accordance with the conventional water tree preventing method causes an increase of cost by 100%.
4. The addition of the electrolyte does not cause any increase in weight and any difficulty in the connection work.
5. The electric characteristics of the power cable are unaffected by the addition of the electrlyte.

The following description covers some of the preferred embodiments of this invention by way of examples:

EXAMPLE 1

Micro-particles (grain size not exceeding 1 μm) of sodium chloride, sodium sulfate, ammonium chloride, copper sulfate or sodium acetate is added in the ratio as shown in Table 1 below and mixed with DCP (di-cumyl peroxide) which is employed as a cross-linking agent for polyethylene. Using this mixture, a cross-linked polyethylene insulated power cable of the class of 6 KV is prepared by an ordinary method. Each of the power cable samples prepared in this manner is subjected to a test which is carried out by immersing it in water and applying high voltage of 8 KV thereto for a period of 180 days. After the test, these samples are checked for water tree. However, no samples show the occurrence of such, while a sample of power cable which is prepared without adding the above stated electrolytes shows the occurrence of such as shown in Table 1 as a comparison example.

Table 1

| Electrolyte added | Amount added to DCP(wt. %) | "Water tree" |
| --- | --- | --- |
| NaCl | 0.01 | None |
| " | 0.1 | " |
| " | 1 | " |
| Na$_2$SO$_4$ | 0.05 | " |
| " | 0.1 | " |
| NH$_4$Cl | 0.1 | " |
| CuSO$_4$ | 0.2 | " |
| Sodium acetate | 0.5 | " |
| Not added | — | Occurred |

EXAMPLE 2

Micro-particles of sodium sulfate of grain size not exceeding 1 μm are mixed with polyethylene in a ratio of 0.01% using a Brabender plastograph. Using this polyethylene compound, a cross-linked polyethylene cable of the class of 6 KV similar to those described in Example 1 is prepared. The cable is subjected to the water immersion and high voltage of 8 KV applying test for 180 days in the same manner as in Example 1. However, no water tree occurs through the test.

EXAMPLE 3

An aqueous solution of sodium sulfate is prepared. Polyethylene pellets are immersed in the aqueous solution and taken out therefrom. The aqueous solution sticking to the surfaces of these pellets are quickly dried with a hot air. The ratio of the quantity of the sodium sulfate depositing and sticking to the pellet surfaces to that of the polyethylene is 0.02% by weight. A power cable similar to those of Example 1 is prepared using the polyethylene pellets. The power cable does not shown any water tree after it has undergone the same test as in Example 1.

EXAMPLE 4

An aqueous solution of sodium sulfate is prepared. The solution is dropped while polyethylene is subjected to a roll mixing process. The solution is evaporated through the process and the sodium sulfate is mixed with the polyethylene. The polyethylene compound thus obtained is used for the preparation of a power cable, which is subjected to a test in the same manner as in Example 1. However, no water tree is generated by the test.

EXAMPLE 5

Sodium chloride or sodium sulfate are stuck to the surfaces of polyethylene pellets by the same method as in Example 3. Then, using the pellets, cross-linkable polyethylene tapes for mold joints are prepared. Following this, cross-linked polyethylene mold joints of the class of 20 KV are prepared from the tapes. Each joint sample thus obtained is subjected to a test which is carried out for a period of 12 months by placing it in water and applying high voltage of 8 KV thereto. Table 2 shows the test results of these samples in comparison with that of a sample which is prepared without such additives. Table 2 also shows a sample which is prepared by sticking sodium sulfate to the tape surface only.

Table 2

| Additive | Ratio to polyethylene, wt % | "Water tree" |
|---|---|---|
| NaCl | 0.05 | None |
| " | 0.1 | " |
| Na$_2$SO$_4$ | 0.05 | " |
| " | 0.1 | " |
| No additive | — | Occurred |
| Na$_2$SO$_4$ only to tape surface | 0.01 | None |

As shown in Examples 1 through 5 above, the water tree of the plastic insulations of power cables and their accessories can be effectively prevented in accordance with this invention. With the conventionally employed water screening layer such as a metal sheath thus no longer required for preventing water tree, the invented method gives a great advantage in terms of costs.

EXAMPLES 6–9 AND COMPARISON EXAMPLES 1 AND 2

Cross-linkable polyethylene tapes are prepared from compounds which are obtainable by blending 0.002 part by weight (Example 6), 0.02 part by weight (Example 7), 0.2 part by weight (Example 8) and 0.5 part by weight (Example 9) of sodium sulfate with 100 parts by weight of polyethylene respectively. Using each of the non-bridged polyethylene tapes, a mold joint part of a 20 KV cross-linked polyethylene insulated power cable is prepared.

In addition to such joint part samples, joint parts are also prepared, for comparison, one from a cross-linkable polyethylene tape (Comparison Example 1) and another from another cross-linkable polyethylene tape made of a polyethylene containing a cross-linking agent with 0.5 part by weight of talc blended in 100 of polyethylene (Comparison Example 2). These comparison samples of mold joint parts of 20 KV cross-linked polyethylene insulated power cables are also prepared in the same manner as other samples.

A total of six different mold joint parts of 20 KV cross-linked polyethylene insulated power cables prepared as described in the foregoing are subjected to tests in water with high voltage of 8 KV applied for a period of 18 months. After the test, each mold joint sample is examined for the presence of absence of water tree and also for dielectric strength. The test results are as shown in Table 3.

Table 3

| Kinds of mold joints | "Water tree" in insulator layer | Dielectric strength | |
|---|---|---|---|
| | | Before test | After test |
| Sample of Example 6 | None | More than AC180KV | AC190 KV |
| Sample of Example 7 | " | " | AC200 KV |
| Sample of Example 8 | " | " | AC180 KV |
| Sample of Example 9 | " | " | AC200 KV |
| Comparison Example 1 | Occurred | " | AC 80 KV |
| Comparison Example 2 | " | " | AC 70 KV |

What is claimed is:

1. A water tree free electric power cable comprising a conductor enclosed in a sheath of insulation selected from the group consisting of a polyethylene compound, cross-linked polyethylene compound, ethylenepropylene rubber compound and butyl rubber compound, said insulation containing a substantially homogeneously dispersed water soluble strong electrolyte capable of increasing the conductivity of the water in an amount of $10^{-7}$ to 1 percent by weight.

2. The insulated power cable or the accessories thereof as defined in claim 1 wherein said electrolyte is selected from the group consisting of sodium chloride, sodium sulfate or mixtures thereof.

3. The power cable of claim 1, wherein said strong electrolyte is selected from salts of the alkali metals, alkaline earth metals, copper, ammonia, carboxylic acids and organic sulfonic acids.

4. The power cable of claim 3, wherein said strong electrolyte is selected from the group consisting of sodium chloride, sodium sulfate, potassium chloride, potassium sulfate, ammonium chloride, cupric sulfate and sodium acetate.

5. The insulated power cable or accessories thereof defined in claim 1 wherein said insulation or a portion thereof is a thin layer of tape having said strong electrolyte adhered to the surface thereof.

6. The insulated power cable of claim 1, wherein a layer of semi-conductive material is provided between said conductor and said insulation.

7. In a method for preventing the deterioration of insulation called water tree in electric power cable the improvement wherein micro-particles of a strong electrolyte which dissolves in water to increase the electric conductivity of the water are added to the insulation material in a ratio to said insulation material between $10^{-7}$% and 1% by weight.

8. A method for preventing the deterioration of insulation called water tree as defined in claim 7 wherein said insulation material is selected from the group consisting of polyethylene, cross-linked polyethylene, ethylenepropylene rubber and butyl rubber.

9. In a process for manufacturing an insulated power cable or the accessories thereof the improvement wherein a strong electrolyte which prevents the deterioration of the insulation called water tree is prearranged to adhere to the surfaces of a pelletized insulation material in the form of micro-particles and said pellets of said insulation material are then molded into insulating material about a conductive member to form a power cable.

10. In a process for manufacturing an insulated power cable or the accessories thereof the improvement wherein a strong electrolyte which prevents the deterioration of a insulation called water tree is added to an additive for said insulation before forming the insulation.

11. In a process for manufacturing an insulated power cable or the accessories thereof the improvement wherein a strong electrolyte which prevents the deterioration of a plastic insulation called water tree is dissolved in a solvent which is capable of dissolving the electrolyte; a solution thus obtained is added to said insulation material, said solvent then being evaporated to leave said electrolyte in the form of micro-particles dispersed in the insulation material; and then said insulation is formed with said plastic insulation material.

* * * * *